United States Patent
Matsuki

(10) Patent No.: US 10,077,366 B2
(45) Date of Patent: Sep. 18, 2018

(54) ANTIFOULING COATING COMPOSITION, ANTIFOULING COATING FILM FORMED USING SAID COMPOSITION, AND COATED ARTICLE HAVING ANTIFOULING COATING FILM ON SURFACE

(71) Applicant: Nitto Kasei Co., Ltd., Osaka-shi, Osaka (JP)

(72) Inventor: Takashi Matsuki, Osaka (JP)

(73) Assignee: Nitto Kasei Co., Ltd., Osaka (JP)

( * ) Notice: Subject to any disclaimer, the term of this patent is extended or adjusted under 35 U.S.C. 154(b) by 0 days.

(21) Appl. No.: 15/611,302

(22) Filed: Jun. 1, 2017

(65) Prior Publication Data

US 2017/0306168 A1 Oct. 26, 2017

Related U.S. Application Data

(63) Continuation of application No. 14/773,188, filed as application No. PCT/JP2014/055320 on Mar. 3, 2014.

(30) Foreign Application Priority Data

Mar. 15, 2013 (JP) ................................. 2013-053584

(51) Int. Cl.

| B63B 59/04 | (2006.01) |
|---|---|
| C08K 3/30 | (2006.01) |
| C09D 133/04 | (2006.01) |
| C09D 143/04 | (2006.01) |
| C09D 5/16 | (2006.01) |
| C09D 7/40 | (2018.01) |
| C09D 1/00 | (2006.01) |

(52) U.S. Cl.

CPC .............. *C09D 5/1668* (2013.01); *C08K 3/30* (2013.01); *C09D 1/00* (2013.01); *C09D 5/16* (2013.01); *C09D 5/1662* (2013.01); *C09D 5/1687* (2013.01); *C09D 7/40* (2018.01); *C09D 133/04* (2013.01); *C09D 143/04* (2013.01); *B63B 59/04* (2013.01); *C08K 2003/3045* (2013.01)

(58) Field of Classification Search
CPC ....... C08K 3/30; C08K 2003/45; C08L 43/04; B63B 59/04; C09D 133/04
See application file for complete search history.

(56) References Cited

U.S. PATENT DOCUMENTS 6,916,860 B2 * 7/2005 Oya ..................... C09D 143/00
106/15.05

FOREIGN PATENT DOCUMENTS

| JP | 07-102193 A | 4/1995 |
|---|---|---|
| JP | 08-269390 A | 10/1996 |
| JP | 09-148946 A | 2/1997 |
| JP | 10-030071 A | 2/1998 |
| JP | 2003-502473 A | 1/2003 |
| JP | 2006-152205 A | 6/2006 |
| WO | 2009/057505 A1 | 5/2009 |
| WO | 2009/149919 A1 | 12/2009 |
| WO | 2010/071180 A1 | 6/2010 |

OTHER PUBLICATIONS

International Search Report, dated May 13, 2014, issued in corresponding International Application No. PCT/JP2014/055320, filed Mar. 3, 2014, 2 pages.
Non-Final Rejection dated Aug. 2, 2016, for U.S. Appl. No. 14/773,188, filed Sep. 4, 2015.

* cited by examiner

*Primary Examiner* — Alma Pipic
(74) *Attorney, Agent, or Firm* — Christensen O'Connor Johnson Kindness PLLC

(57) ABSTRACT

The present invention provides antifouling coating compositions having excellent long-term storage stability and provides an antifouling coating composition that can maintain the stable dissolution and antifouling performance of a coating film without causing coating film defects such as cracks in seawater for a long term, such that an antifouling coating film having increased environmental safety can be formed. The present invention provides an antifouling coating composition containing: (A) a triorganosilyl ester-containing copolymer obtained from a mixture of (a) a triorganosilyl (meth)acrylate monomer represented by general formula (1):

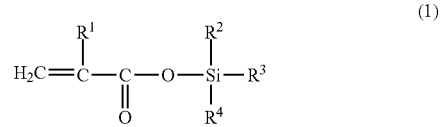

(1)

(here, $R^1$ is a hydrogen atom or a methyl group; and $R^2$, $R^3$, and $R^4$ are the same or different from each other and each represents a $C_{3-6}$ alkyl group branched at the α-position or a phenyl group) and (b) an ethylenically unsaturated monomer copolymerizable with the triorganosilyl (meth)acrylate monomer; and (B) calcium sulfate hydrate.

3 Claims, No Drawings

ANTIFOULING COATING COMPOSITION, ANTIFOULING COATING FILM FORMED USING SAID COMPOSITION, AND COATED ARTICLE HAVING ANTIFOULING COATING FILM ON SURFACE

CROSS-REFERENCES TO RELATED APPLICATIONS

This application is a continuation of U.S. patent application Ser. No. 14/773,188, filed Sep. 4, 2015, which is a National Stage of International Application No. PCT/JP2014/055320, filed Mar. 3, 2014, all of which are incorporated herein by reference in their entireties.

TECHNICAL FIELD

The present invention relates to an antifouling coating composition and a coated object having, on its surface, an antifouling coating film formed using the composition.

BACKGROUND

Aquatic fouling organisms such as barnacles, tubeworms, common mussels, *Bugula neritina*, sea squirts, green laver, sea lettuce, and slimes attach to ships (especially ship bottoms), fishing tools such as fishing nets and fishing net accessories, and structures submerged in seawater such as power plant aqueducts, leading to dysfunction, impaired appearance, and other problems of the ships and so on.

Since a conventional organic tin-containing copolymer has been banned, triorganosilyl group-containing copolymers which have low toxicity and are environment-friendly have been developed, and have been used for antifouling coating materials (Patent Literature 1).

When the triorganosilyl ester-containing copolymer is used, the copolymer initially dissolves in seawater at a constant rate. The dissolving rate of the coating film gradually increases, and becomes excessively high after a long period of time has elapsed. Unfortunately, this makes the design of the coating material difficult. Because of the above, disclosed is an antifouling coating material that exerts the long-term stable dissolution of the coating film by using rosin, a rosin derivative, or a metal salt thereof in addition to the triorganosilyl ester-containing copolymer (Patent Literature 2).

Although the antifouling coating material can exert the long-term stable dissolution of the coating film, the coating film after long-term soaking in seawater tends to cause coating film defects such as a crack. In order to provide a solution to these problems, various proposals have been presented, including blending the triorganosilyl ester-containing copolymer with an additional resin, a plasticizer, other various additives, etc.

Although the additional resin-blended antifouling coating material has improved coating film properties regarding a crack, etc., to some degree, the material cannot achieve the long-term stable dissolution of the coating film any more (Patent Literatures 3 to 6). In addition, when a small amount of the plasticizer is added, the plasticizer-blended antifouling coating material hardly exerts an advantageous effect. By contrast, when a large amount of the plasticizer is added, the coating film properties regarding a crack, etc., are improved to some degree. Unfortunately, the coating film is fragile and the dissolution of the coating film becomes too large. Further, the antifouling coating material blended with fiber as another additive can produce an effect of preventing a coating film defect such as a crack. Unfortunately, the dissolution of the coating film is decreased such that the long-term stable dissolution of the coating film cannot be achieved (Patent Literature 7).

So far, there is no antifouling coating composition which can keep the antifouling performance and stable dissolution of the coating film without causing coating film defects such as a crack during long-term seawater treatment.

CITATION LIST

Patent Literature

Patent Literature 1: JP-A-Hei 7-102193
Patent Literature 2: JP-A-Hei 10-30071
Patent Literature 3: JP-A-Hei 8-269390
Patent Literature 4: JP-A-Hei 9-48946
Patent Literature 5: JP-A-2006-152205
Patent Literature 6: JP-A-Hei 9-48946
Patent Literature 7: JP-A-2003-502473 (Translation of PCT Application)

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Technical Problem

It is an object of the present invention to provide an antifouling coating composition having excellent stability during long-term storage and to provide an antifouling coating composition which can maintain the stable coating film dissolution property and antifouling performance of a coating film without causing coating film defects such as a crack during long-term seawater treatment and which is used to produce an antifouling coating film having increased environmental safety.

Solution to Problem

An aspect of the present invention provides an antifouling coating composition comprising: (A) a triorganosilyl ester-containing copolymer obtained from a mixture of (a) a triorganosilyl (meth)acrylate monomer represented by general formula (1):

[Chemical Formula 1]

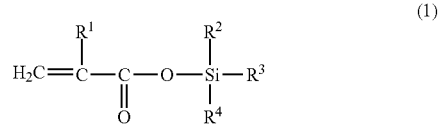

(wherein $R^1$ is a hydrogen atom or a methyl group; and $R^2$, $R^3$, and $R^4$ are the same or different from each other and each represents a $C_{3-6}$ alkyl group branched at an α-position or a phenyl group) and (b) an ethylenically unsaturated monomer copolymerizable with the triorganosilyl (meth)acrylate monomer; and (B) calcium sulfate hydrate.

The present inventor have addressed the problems of developing an antifouling coating composition that can maintain the stable coating film dissolution property and antifouling performance of a coating film without causing coating film defects such as a crack during long-term seawater treatment. First, many various additional resins and/or plasticizers, for example, were examined, but the problems were not successfully resolved.

Next, in order to resolve the problems, use of various fillers (e.g., calcium carbonate, barium sulfate, silica, bentonite, talc, zinc oxide, red iron oxide) were examined. Although the use was able to increase an initial (a stage before soaking in seawater) coating film strength, cracks occurred in the antifouling coating film after soaking in seawater for a given period. Consequently, the coating film defects were not fixed. Further, the stable dissolving rate of the coating film was unable to be maintained, which resulted in a poor long-term antifouling effect.

Since such results were obtained, the present inventor thought of excluding the filler from the candidates so as to provide a solution to the above problems. At the end, calcium sulfate hydrate according to an aspect of the present invention was tested. Then, a surprising result was obtained: when a certain amount or more of the calcium sulfate hydrate was added to the coating composition, not only the initial (a stage before soaking in seawater) coating film strength was increased, but also no coating film defects (e.g., a crack) occurred in the antifouling coating film after soaking in seawater for a given period. In addition, an unexpected effect was also obtained: in addition to inhibiting the dissolution of the coating film, an effect of optimizing the dissolving rate of the coating film was exerted. Further, it was found that use of the calcium sulfate hydrate contributed to improving, for example, smoothness (hydrophilicity on the coating film surface), impact resistance, adhesiveness, and/or block resistance.

Moreover, further detailed examination revealed as follows: only when $R^2$, $R^3$, and $R^4$ of the copolymer (A) of the above chemical formula (1) were $C_{3-6}$ alkyl group branched at the α-position or a phenyl group, such an unexpected effect was obtained; and when the $R^2$, $R^3$, and $R^4$ were linear alkyl group, the excellent effect was not achieved (see Comparative Example 9).

In this way, the above unexpected effect was found to be obtained because of the synergistic effect exerted by the combination of the copolymer (A) having the specific components and the calcium sulfate hydrate.

Advantageous Effects of Invention

The present invention provides the antifouling coating compositions having excellent storage stability and can produce an antifouling coating film with increased antifouling performance maintained for an extended period of time.

DETAILED DESCRIPTION

While illustrative embodiments have been illustrated and described, it will be appreciated that various changes can be made therein without departing from the spirit and scope of the invention.

Antifouling Coating Composition

An antifouling coating composition according to an embodiment of the present invention comprises: (A) a triorganosilyl ester-containing copolymer obtained from a mixture of (a) a triorganosilyl (meth)acrylate monomer represented by general formula (1):

[Chemical Formula 1]

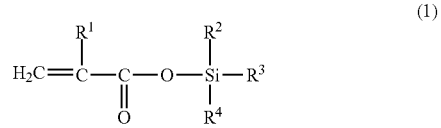

(wherein $R^1$ is a hydrogen atom or a methyl group; and $R^2$, $R^3$, and $R^4$ are the same or different from each other and each represents a $C_{3-6}$ alkyl group branched at the α-position or a phenyl group) and (b) an ethylenically unsaturated monomer copolymerizable with the triorganosilyl (meth)acrylate monomer; and (B) calcium sulfate hydrate.

<Copolymer (A)>

A copolymer (A) of the present invention is produced by copolymerization of the monomer (a) and the monomer (b). The following specifically describes methods of synthesizing the monomer (a), the monomer (b), and the copolymer (A).

Monomer (a)

Examples of the $C_{3-6}$ alkyl group branched at the α-position include isopropyl group, s-butyl group, t-butyl group, 1-ethylpropyl group, 1-methylbutyl group, 1-methylpentyl group, 1,1-dimethylpropyl group, 1,1-dimethylbutyl group, and thexyl group.

In particular, the invention enables formation of an antifouling coating film which is unlikely to cause coating film defects and is excellent in water resistance by selecting specific groups for $R^2$, $R^3$, and $R^4$. From such an aspect, $R^2$, $R^3$, and $R^4$ are the same or different from each other, and are each preferably isopropyl group, s-butyl group, t-butyl group, or phenyl group, and more preferably isopropyl group.

Examples of the monomer (a) include triisopropylsilyl (meth)acrylate, tri-s-butylsilyl (meth)acrylate, triphenylsilyl (meth)acrylate, diisopropyl-s-butylsilyl (meth)acrylate, diisopropyl-t-butylsilyl (meth)acrylate, diisopropylthexylsilyl (meth)acrylate, diisopropylphenylsilyl (meth)acrylate, isopropyl-di-s-butylsilyl (meth)acrylate, isopropyl-diphenylsilyl (meth)acrylate, diphenylthexlysilyl (meth)acrylate, and t-butyldiphenylsilyl (meth)acrylate. In particular, from a viewpoint of forming an antifouling coating film which is unlikely to cause coating film defects and is excellent in water resistance, triisopropylsilyl (meth)acrylate, tri-s-butylsilyl (meth)acrylate, and t-butyldiphenylsilyl (meth)acrylate are preferred, and triisopropylsilyl (meth)acrylate is more preferred. These triorganosilyl (meth)acrylate monomers are used singly or in combination.

Monomer (b)

The monomer (b) is an ethylenically unsaturated monomer copolymerizable with the monomer (a). Examples of the monomer (b) include: (meth)acrylic esters such as methyl (meth)acrylate, ethyl (meth)acrylate, n-butyl (meth)acrylate, i-butyl (meth)acrylate, t-butyl (meth)acrylate, 2-ethylhexyl (meth)acrylate, lauryl (meth)acrylate, 2-methoxyethyl acrylate, 2-methoxypropyl acrylate, 4-methoxybutyl acrylate, 2-ethoxyethyl (meth)acrylate, ethylene glycol monomethyl ether (meth)acrylate, propylene glycol monomethyl ether (meth)acrylate, 2-hydroxyethyl (meth)acrylate, 2-hydroxypropyl (meth)acrylate, dimethylaminoethyl (meth)acrylate, diethylaminoethyl (meth)acrylate, benzyl (meth)acrylate, and phenyl (meth)acrylate and the like; vinyl compounds such as vinyl chloride, vinylidene chloride, (meth)acrylonitrile, vinyl acetate, butyl vinyl ether, lauryl vinyl ether, n-vinyl pyrrolidone and the like; aromatic compounds such as styrene, vinyl toluene, α-methyl styrene and the like. Among them, in particular, (meth)acrylic esters are preferred, and methyl (meth)acrylate, ethyl (meth)acrylate, n-butyl (meth)acrylate, i-butyl (meth)acrylate, 2-ethylhexyl (meth)acrylate, and 2-methoxyethyl acrylate are more preferred. Examples of the monomer (b) may be used singly or in combination as a monomer component of the copolymer (A).

Synthesis of Copolymer (A)

The copolymer (A) is obtained by polymerizing a mixture of the monomer (a) and the monomer (b).

The content of the monomer (a) in the mixture is preferably from about 20 to 70% by mass, and more preferably from about 30 to 60% by weight. When the content of the monomer (a) is from about 20 to 70% by weight, the coating film formed using the resultant antifouling coating composition can exhibit the stable coating film dissolution property, and it can maintain an antifouling effect for a long period of time.

The glass-transition temperature (Tg) of the copolymer (A) is preferably from about 20 to 80° C. and is more preferably from about 30 to 70° C. When the Tg is from about 20 to 80° C., the coating film hardness is hardly dependent on water temperature or air temperature, and thus suitable hardness and strength can be maintained for a long time. Consequently, coating film defects such as cold flow, crack, and peel-off are unlikely to occur.

The copolymer (A) has a weight-average molecular weight (Mw) of preferably from 10,000 to 100,000 and more preferably from 20,000 to 70,000. When the Mw is from 10,000 to 100,000, the coating films are not brittle and have a suitable dissolving rate, so that a desired antifouling effect can be effectively exerted. One example of the method for measuring the Mw is gel permeation chromatography (GPC).

The copolymer (A) may be any one of a random copolymer, alternate copolymer, periodical copolymer, and block copolymer between the monomer (a) and the monomer (b). The copolymer (A) can be prepared by polymerizing the monomer (a) and the monomer (b) under the presence of, for example, a polymerization initiator.

With regard to the polymerization initiator used in the polymerization reaction, those similar to the below-described polymerization initiator can be used singly or in combination. Examples of the preferable polymerization initiator include AIBN, in particular, and t-butyl peroxy-2-ethyl hexanoate. The molecular weight of the copolymer A can be adjusted by suitably selecting the amount of the polymerization initiator used.

Examples of polymerization methods include solution polymerization, bulk polymerization, emulsion polymerization, and suspension polymerization. Among them, the solution polymerization is preferable because it allows the copolymer A to be prepared easily and accurately.

In the polymerization reaction, an organic solvent may be added, if necessary. Examples of the organic solvent include aromatic hydrocarbon-based solvents (e.g., xylene, toluene); aliphatic hydrocarbon-based solvents (e.g., hexane, heptane); ester-based solvents (e.g., ethyl acetate, butyl acetate, isobutyl acetate, methoxypropyl acetate); alcohol-based solvents (e.g., isopropyl alcohol, butyl alcohol); ether-based solvents (e.g., dioxane, diethyl ether, dibutyl ether); and ketone-based solvents (e.g., methyl ethyl ketone, methyl isobutyl ketone). Among them, aromatic hydrocarbon-based solvents are preferable, and xylene is more preferable. These solvents may be used singly or in combination.

The reaction temperature in the polymerization reaction may be suitably selected depending on the type of the polymerization initiator, etc., and is usually from about 70 to 140° C. and preferably from about 80 to 120° C. The reaction time necessary for the polymerization reaction may be suitably selected depending on the reaction temperature, etc., and is usually from about 4 to 8 hours. The polymerization reaction is preferably conducted under an inert gas (e.g. nitrogen gas and argon gas) atmosphere.

The amount of the copolymer (A) in the composition of the present invention is not particularly limited, and is usually from 20 to 70% by mass and preferably 40 to 60% by mass with respect to the solid content of the composition of the present invention. When the amount of the copolymer A is from 20 to 70% by mass, the suitable dissolving rate and properties of the coating film in seawater can be achieved. In addition, the long-term stable surface renewal can remain constant and a desired antifouling effect can be effectively exerted. Also, the coating film can exert excellent recoating performance.

<Calcium Sulfate Hydrate (B)>

The content of the calcium sulfate hydrate (B) of the present invention is from 5 to 50% by mass with respect to the solid content of the composition of the present invention, and more preferably from 10 to 30% by mass. When the content of the calcium sulfate hydrate (B) is within the above range, not only the initial (a stage before soaking in seawater) coating film strength is increased, but also no coating film defects (e.g., cracks) occur in the antifouling coating film after soaking in seawater for a given period. In addition, an effect of optimizing the coating film dissolving rate can be exerted. Further, use of the calcium sulfate hydrate can achieve, for example, increased smoothness (hydrophilicity on the coating film surface), impact resistance, adhesiveness, and/or block resistance. The content of the calcium sulfate hydrate (B) is specifically, for example, 5, 10, 15, 20, 25, 30, 35, 40, 45, or 50% by mass with respect to the solid content of the composition of the present invention, or may be between any two of the above-described values.

Examples of the calcium sulfate hydrate (B) of the present invention include calcium sulfate dihydrate and calcium sulfate hemihydrate. When the calcium sulfate dihydrate is included, in particular, the above effect can be markedly exerted.

The calcium sulfate hydrate (B) has an average particle size of usually less than 50 μm. From the viewpoint of crack resistance, the size is preferably from 1 to 10 μm.

Among the calcium sulfate hydrates (B), calcium sulfate dihydrate can be prepared by, for example, grinding, crystallization, or precipitation. In addition, calcium sulfate hemihydrate can be prepared by heating a raw plaster material at high temperatures. Also, calcium sulfate hemihydrate may be a by-product during a technical step such as a process for producing phosphorous acid and/or hydrogen fluoride. Further, commercially available products may also be used as the calcium sulfate hydrate.

The content proportion of the copolymer (A) to the calcium sulfate hydrate (B) is from 0.4 to 3 by mass ratio when converted to a solid content. In this case, the effect of optimizing the coating film dissolving rate can be markedly exerted. When the content proportion is from 0.6 to 1.5, the above effect can be exerted further. This mass ratio is specifically, for example, 0.4, 0.5, 0.6, 1, 1.5, 2, 2.5, or 3, or may be between any two of the above-described values.

The antifouling coating composition of the present invention may further contain, as necessary, an antifoulant (C), a release modifier (D), a plasticizer (E), another resin (F), and the like in addition to the copolymer (A) and the calcium sulfate hydrate (B). The addition can improve the antifouling effect.

<Antifoulant (C)>

There is no limitation to the antifoulants (C) as long as they have a killing or repelling effect against aquatic fouling organisms. Examples can include inorganic and organic antifoulants.

Examples of the inorganic antifoulants include cuprous oxide, copper thiocyanate (general name: copper rhodanide), cupronickel, and copper powder. Among them, cuprous oxide and copper rhodanide are particularly preferred.

Examples of the organic antifoulants include: organic copper compounds such as 2-mercaptopyridine-N-oxide copper (general name: copper pyrithione) and the like; organic zinc compounds such as 2-mercaptopyridine-N-oxide zinc (general name: zinc pyrithione), zinc ethylene bis(dithio carbamate) (general name: zineb), zinc bis(dimethyldithiocarbamate) (general name: ziram), dizinc bis(dimethyldithiocarbamate)ethylenebis(dithiocarbamate) (general name: polycarbamate) and the like; organic boron compounds such as pyridine-triphenylborane, 4-isopropyl pyridyl-diphenylmethyl borane, 4-phenyl pyridiyl-diphenyl borane, triphenylboron-n-octadecyl amine, triphenyl[3-(2-ethylhexyloxy) propyl amine]boron and the like; maleimide compounds such as 2,4,6-trichloromaleimide, N-(2,6-diethylphenyl)-2,3-dichloromaleimide and the like; and 4,5-dichloro-2-n-octyl-3-isothiazolone (general name: Sea-Nine 211), 3,4-dichlorophenyl-N—N-dimethylurea (general name: diuron), 2-methylthio-4-t-butylamino-6-cyclopropylamino-s-triazine (general name: Irgarol 1051), 2,4,5,6-tetrachloroisophthalonitrile (general name: chlorothalonil), N-dichlorofluoromethylthio-N',N'-dimethyl-N-p-tolyl sulfamide (general name: tolylfluanid), N-dichloromethylthio-N',N'-dimethyl-N-phenylsulfamide (general name: dichlofluanid), 2-(4-thiazolyl)benzimidazole (general name: thiabendazole), 3-(benzo[b]thien-2-yl)-5,6-dihydro-1,4,2-oxathiazine-4-oxide (general name: bethoxazine), 2-(p-chlorophenyl)-3-cyano4-bromo5-trifluoromethyl pyrrole (general name: ECONEA 028), etc. Among them, particularly preferred are zinc pyrithione, copper pyrithione, pyridine-triphenylborane, 4-isopropyl pyridyl-diphenylmethyl borane, bethoxazine, zineb, Sea-Nine 211, and Irgarol 1051. More preferred are copper pyrithione, zinc pyrithione, pyridine-triphenylborane, and bethoxazine.

As the antifoulant (C), preferred are cuprous oxide, copper rhodanide, zinc pyrithione, copper pyrithione, pyridine-triphenylborane, 4-isopropyl pyridyl-diphenylmethyl borane, bethoxazine, zineb, Sea-Nine 211, Irgarol 1051, tolylfluanid, and dichlofluanid. More preferred are cuprous oxide, copper pyrithione, zinc pyrithione, pyridine-triphenylborane, and bethoxazine.

These antifoulants may be used singly or in combination. The amount of the antifoulant (C) in the composition of the present invention is not particularly limited, and is usually from 0.1 to 75% by mass and preferably from 1 to 60% by mass with respect to the solid content of the composition of the present invention. When the amount of the antifoulant (C) is less than 0.1% by mass, a sufficient antifouling effect might not be obtained. When the amount of the antifoulant (C) is over 75% by mass, the obtained coating film is fragile and adherence of the coating film to an object to be coated is weak, and thus the coating film does not sufficiently exhibit the function as an antifouling coating film.

<Release Modifier (D)>

Examples of the release modifier (D) include rosin, a rosin derivative and a metal salt thereof, monocarboxylic acid and a salt thereof, and an alicyclic hydrocarbon resin.

Examples of the rosin include tall oil rosin, gum rosin, and wood rosin. Examples of the rosin derivative include hydrogenated rosin, disproportionated rosin, maleinized rosin, formylated rosin, and polymerized rosin. A reaction product of a metal compound with rosin can be used as a metal salt of the rosin or a metal salt of rosin derivative. Examples of the metal salt include a zinc (or copper) salt of gum rosin, a zinc (or copper) salt of wood rosin, and a zinc (or copper) salt of tall oil rosin. Examples of the metal salt of the rosin derivative include a zinc (or copper) salt of hydrogenated rosin, a zinc (or copper) salt of disproportionated rosin, a zinc (or copper) salt of maleinized rosin, a zinc (or copper) salt of formylated rosin, and a zinc (or copper) salt of polymerized rosin.

Examples of the monocarboxylic acid include $C_{5-30}$ fatty acid, synthetic fatty acid, and naphthenic acid. Examples of a salt of the monocarboxylic acid include copper salts, zinc salts, magnesium salts, and calcium salts.

Examples of the commercially available alicyclic hydrocarbon resin include Quintone 1500, 1525L, and 1700 (product name; manufactured by ZEON CORPORATION).

In view of giving the composition of the present invention a suitably facilitated elution property, the composition preferably contains at least one member selected from the group consisting of rosin, a rosin derivative, and a metal salt thereof as the release modifier (D). In view of improving crack resistance and water resistance, the composition more preferably contains a copper or zinc salt of rosin or a rosin derivative.

The amount of the release modifier (D) in the composition of the present invention is usually from 1 to 80 parts by mass and preferably from 10 to 50 parts by mass with respect to 100 parts by mass of the copolymer (A). When the release modifier (D) is less than 1 part by mass, the effect of preventing attachment of aquatic fouling organisms, in particular, during rigging cannot be expected. When the amount of the release modifier (D) is over 80 parts by mass, defects such as cracks and peeling tend to occur in the coating film, and thus the effect of preventing attachment of aquatic fouling organisms might not be sufficiently exhibited. The amount of the release modifier (D) is, for example, 1, 5, 10, 15, 20, 25, 30, 35, 40, 45, 50, 55, 60, 65, 70, 75, or 80 parts by mass with respect to 100 parts by mass of the copolymer (A). The amount may be between any two of the above-described values.

<Plasticizer (E)>

By adding the plasticizer (E) to the antifouling coating composition of the present invention, it is possible to improve the plasticity of the composition, and as a result it is possible to suitably form a strong coating film.

Examples of the plasticizer (E) include: phosphate esters such as tricresyl phosphate, trioctylphosphate, triphenyl phosphate and the like; phthalate esters such as dibutyl phthalate, dioctyl phthalate and the like; adipate esters such as dibutyl adipate, dioctyl adipate and the like; sebacate esters such as dibutyl sebacate, dioctyl sebacate and the like; epoxidized oils and fats such as epoxidized soybean oil, epoxidized linseed oil and the like; alkyl vinyl ether polymers such as methyl vinyl ether polymer, ethyl vinyl ether polymer and the like; polyalkylene glycols such as polyethylene glycol, polypropylene glycol and the like; and t-nonylpentasulfide, vaseline, polybutene, tris(2-ethyl hexyl)

trimellitate, silicone oil, liquid paraffin, and chlorinated paraffin. These plasticizers may be used singly or in combination.

The amount of the plasticizer (E) in the composition of the present invention is usually from 0.1 to 20 parts by mass and preferably from 0.5 to 10 parts by mass with respect to 100 parts by mass of the copolymer (A).

<Another Resin (F)>

Another resin (F) is added to the antifouling coating composition of the present invention. This makes it possible to reduce cost without impairing the effects of the present invention. Also, a synergistic effect with the resin (F) properties can be obtained.

Examples of another resin (F) include a (meth)acrylic resin, an alkyd resin, a polyester resin, a chlorinated rubber resin, and a vinyl resin. Another resin (F) can be added to the composition of the present invention to such a degree that the suitable dissolving rate and properties of the coating film in seawater are not impaired. Its amount is from 1 to 200 parts by mass and preferably from 20 to 100 parts by mass with respect to 100 parts by mass of the copolymer (A).

<Other Additives>

Furthermore, the antifouling coating composition of the present invention, if necessary, may include a pigment, a dye, an antifoaming agent, an anti-sagging agent, a dispersant, an antisettling agent, a dehydrating agent, and an organic solvent. These additives can be added to such an extent that the suitable dissolving rate and properties of the coating film in seawater are not impaired.

Example of the pigment include zinc oxide, red iron oxide, talc, titanium oxide, silica, calcium carbonate, barium sulfate, calcium oxide, and magnesium oxide. They can be used singly or in combination.

Examples of the dye include various kinds of organic dyes soluble in an organic solvent.

Examples of the antifoaming agent include a silicone resin-based antifoaming agent and an acryl resin-based antifoaming agent.

Examples of the anti-sagging agent, the dispersant or the antisettling agent include fatty acid amide wax and oxidized polyethylene.

Examples of the dehydrating agent include silicates such as a synthetic zeolite-based adsorbent, orthoesters, tetraethoxysilane and the like, and isocyanates. They can be used singly or in combination.

Examples of the organic solvent include an aliphatic solvent, an aromatic solvent, a ketone-based solvent, an ester-based solvent, an ether-based solvent, and the like which are usually used in the antifouling coating material. They can be used singly or in combination.

Method for Producing Antifouling Coating Composition

The antifouling coating composition of the present invention can be manufactured, for example, by mixing and dispersing a mixed solution containing the copolymer (A) and the calcium sulfate hydrate (B) by use of a disperser.

The amounts of the copolymer (A) and the calcium sulfate hydrate (B) in the mixed solution may be suitably adjusted such that the resulting antifouling coating composition contains the copolymer (A) and the calcium sulfate hydrate (B) as described above.

The mixed solution is preferably obtained by dissolving or dispersing, in a solvent, various materials such as the copolymer (A) and the calcium sulfate hydrate (B). As the solvent, those similar to the above organic solvent may be used.

As the disperser, for example, the one which can be used as a micro-pulverizer can be suitably used. For example, a commercially available homo mixer, sand mill, bead mill, or the like can be used. Furthermore, the mixed solution may be mixed and dispersed by use of a stirrer-equipped container containing glass beads for mixing and dispersing.

Antifouling Treatment, Antifouling Coating Film, and Coated Object

The antifouling treatment of the invention is characterized in that an antifouling coating film is formed using the above-explained antifouling coating composition on the surface of an object that is subjected to coating. The antifouling treatment of the present invention can prevent adhesion of aquatic fouling organisms by the gradual dissolution of the surface of the antifouling coating film such that the surface of the coating film is continually renewed. After the dissolution of the coating film, the antifouling effect can be continuously exhibited by recoating the composition.

Examples of objects on which a coating film can be formed include ships (in particular, ship bottoms), fishing tools, and structures submerged in seawater. Examples of the fishing tools include fishing nets for use in aquaculture or in fixed netting, and fishing net accessories such as ropes and floats attached to fishing nets. Examples of the structures submerged in seawater include power plant aqueducts, bridges, and port facilities.

The antifouling coating film can be formed by applying the antifouling coating composition to the surface (entirely or partially) of an object onto which the coating film is to be formed. Examples of the coating method include brush coating, spray coating, dipping, flow coating, and spin coating. These coating methods may be employed singly or in combination. The coating composition is dried after the application. The drying temperature may be room temperature. The drying time may be suitably selected depending on the thickness of the coating film, etc.

The antifouling coating film produced using the above antifouling coating composition according to an embodiment of the present invention can exhibit the suitable dissolving rate and properties of the coating film in seawater. In addition, the long-term stable surface renewal can remain constant and a desired antifouling effect can be effectively exerted. Also, the coating film can advantageously exert excellent recoating performance.

The thickness of the antifouling coating film may be suitably selected depending on types of an object on which the coating film is to be formed, the navigation speed of a ship, the seawater temperature, etc. For example, when the object on which the coating film is to be formed is a ship bottom, the thickness of the antifouling coating film is usually from 50 to 500 μm and preferably from 100 to 400 μm. The antifouling coating film of the present invention has a suitable hardness. Specifically, the antifouling coating film of the present invention has an hardness enough to cause no coating film defects such as cold flow.

The coated object of the present invention has the antifouling coating film on its surface. The coated object of the present invention may have the antifouling coating film on the entire surface thereof or on the partial surface thereof. The coated object of the present invention is provided with a coating film having long-term stable surface renewal and excellent recoating performance because the suitable dissolving rate and properties of the coating film in seawater are improved. Accordingly, the coated object can be preferably applied for the above ships (in particular, ship bottoms), fishing tools, structures submerged in seawater, etc. For example, when the antifouling coating film is formed on the surface of a ship bottom, the antifouling coating film gradually dissolves from the surface, so that the coating film surface is always renewed. This prevents the adhesion of aquatic fouling organisms.

Furthermore, the hydrolysis rate of the antifouling coating film is desirably controlled. Hence, ships benefit from the antifouling effect for a long period of time. Additionally, even when the ships are not moving, for example, during anchorage, rigging, etc., the adhesion and accumulation of aquatic fouling organisms are barely observed and the antifouling effect is exhibited for a long time. In addition, the surface of the antifouling coating film is basically free from cracking or peeling even after a long period of time. Accordingly, it is unnecessary to completely remove the existing coating film before re-forming a new coating film. Thus, by directly recoating the antifouling coating film composition, the antifouling coating film can be effectively formed. This makes it possible to continuously maintain the antifouling effect in a simple and inexpensive manner.

EXAMPLES

The following illustrates Examples, etc., and further clarifies characteristics of the present invention. The present invention, however, is not limited to these Examples.

In each of Production Examples, Comparative Production Examples, Examples, and Comparative Examples, "%" denotes "% by mass". Viscosity was determined at 25° C. using a Brookfield viscometer. The weight-average molecular weight (Mw) was determined by gel permeation chromatography (GPC) (using a polystyrene standard). GPC was performed under the following conditions.

Equipment: HLC-8220 GPC; Tosoh Corporation
Column: TSK-gel Super HZM-M (manufactured by Tosoh Corporation); two columns
Flow rate: 0.35 mL/min
Detector: RI
Column thermostat temperature: 40° C.
Eluent: THF
The non-volatile content was determined by heating for 1 hour at 125° C.
The amounts of each component shown in Table 1 are represented in grams.

Production Example 1 (Production of Copolymer Solution A-1)

First, 230 g of xylene was charged to a flask equipped with a thermometer, a reflux condenser, a stirrer, and a dropping funnel. Next, a mixture of 270 g of triisopropylsilyl methacrylate, 50 g of methyl methacrylate, 130 g of 2-methoxyethyl methacrylate, 30 g of 2-methoxyethyl acrylate, 20 g of ethyl acrylate, and 4 g of t-butyl peroxy-2-ethyl hexanoate (initially added) was added dropwise into the flask over a period of 1 hour while stirring at 100±2° C. under a nitrogen atmosphere. Then, after the resulting reaction solution was stirred at the above temperature for 2 hours, 1 g of t-butyl peroxy-2-ethyl hexanoate (subsequently added) was added three times with 2-hour intervals to complete the polymerization reaction. After that, 270 g of xylene was added and dissolved to produce the triorganosilyl ester-containing copolymer solution A-1. The viscosity of the resulting copolymer solution was 280 cps/25° C., the non-volatile content was 49.5%, the Tg was 46° C., and the Mw was 42,000.

Production Example 2 (Production of Copolymer Solution A-2)

As monomers, 300 g of triisopropylsilyl acrylate, 130 g of methyl methacrylate, 20 g of n-butyl methacrylate, 20 g of n-butyl acrylate, and 30 g of 2-methoxyethyl acrylate as well as the organic solvent and polymerization initiator described in Production Example 1 were used. Polymerization reactions were performed in accordance with the same procedure as in Production Example 1, thus producing the triorganosilyl ester-containing copolymer solution A-2. The viscosity of the resulting copolymer solution was 250 cps/25° C., the non-volatile content was 49.6%, the Tg was 36° C., and the Mw was 45,000.

Production Example 3 (Production of Copolymer Solution A-3)

First, 300 g of xylene was charged to a flask equipped with a thermometer, a reflux condenser, a stirrer, and a dropping funnel. Next, a mixture of 270 g of triisopropylsilyl methacrylate, 50 g of methyl methacrylate, 130 g of 2-methoxyethyl methacrylate, 30 g of 2-methoxyethyl acrylate, 20 g of ethyl acrylate, and 20 g of t-butyl peroxy-2-ethyl hexanoate (initially added) was added dropwise into the flask over a period of 2 hour while stirring at 100±2° C. under a nitrogen atmosphere. Then, after the resulting reaction solution was stirred at the above temperature for 2 hours, 1 g of t-butyl peroxy-2-ethyl hexanoate (subsequently added) was added three times with 2-hour intervals to complete the polymerization reaction. After that, 200 g of xylene was added and dissolved to produce the triorganosilyl ester-containing copolymer solution A-3. The viscosity of the resulting copolymer solution was 70 cps/25° C., the non-volatile content was 49.8%, the Tg was 38° C., and the Mw was 12,000.

Production Example 4 (Production of Copolymer Solution A-4)

First, 200 g of xylene was charged to a flask equipped with a thermometer, a reflux condenser, a stirrer, and a dropping funnel. Next, a mixture of 270 g of triisopropylsilyl methacrylate, 50 g of methyl methacrylate, 130 g of 2-methoxyethyl methacrylate, 30 g of 2-methoxyethyl acrylate, 20 g of ethyl acrylate, and 1 g of t-butyl peroxy-2-ethyl hexanoate (initially added) was added dropwise into the flask over a period of 1 hour while stirring at 85±2° C. under a nitrogen atmosphere. Then, after the resulting reaction solution was stirred at the above temperature for 2 hours, 1 g of t-butyl peroxy-2-ethyl hexanoate (subsequently added) was added three times with 2-hour intervals to complete the polymerization reaction. After that, 300 g of xylene was added and dissolved to produce the triorganosilyl ester-containing copolymer solution A-4. The viscosity of the resulting copolymer solution was 970 cps/25° C., the non-volatile content was 49.3%, the Tg was 49° C., and the Mw was 83,000.

Production Example 5 (Production of Copolymer Solution A-5)

First, 230 g of xylene was charged to a flask equipped with a thermometer, a reflux condenser, a stirrer, and a dropping funnel. Next, a mixture of 275 g of t-butyldiphenylsilyl acrylate, 175 g of methyl methacrylate, 50 g of 2-methoxyethyl acrylate, and 4 g of t-butyl peroxy-2-ethyl hexanoate (initially added) was added dropwise into the flask over a period of 1 hour while stirring at 100±2° C. under a nitrogen atmosphere. Then, after the resulting reaction solution was stirred at the above temperature for 2 hours, 1 g of t-butyl peroxy-2-ethyl hexanoate (subsequently added) was added three times with 2-hour intervals to complete the polymerization reaction. After that, 270 g of xylene was added and dissolved to produce the triorganosilyl ester-containing copolymer solution A-5. The viscosity of the resulting copolymer solution was 810 cps/25° C., the non-volatile content was 51.7%, the Tg was 71° C., and the Mw was 46,000.

Production Example 6 (Production of Copolymer Solution A-6)

As monomers, 225 g of tri-n-butylsilyl methacrylate, 225 g of methyl methacrylate, and 50 g of 2-ethylhexyl acrylate as well as the organic solvent and polymerization initiator described in Production Example 1 were used. Polymerization reactions were performed in accordance with the same procedure as in Production Example 1, thus producing the triorganosilyl ester-containing copolymer solution A-6. The viscosity of the resulting copolymer solution was 280 cps/25° C., the non-volatile content was 50.3%, the Tg was 20° C., and the Mw was 44,000.

Production Example 7 (Production of Copolymer Solution B-1)

First, 100 g of xylene and 20 g of n-butanol were placed in a flask including a thermometer, a reflux condenser, a stirrer, and a dropping funnel. Next, the mixture was heated to 100 to 110° C., and a mixed solution containing 25.7 g of acrylic acid, 57.8 g of ethyl acrylate, 16.5 g of methyl methacrylate, and 3 g of azobisisobutyronitrile was then added dropwise over 4 hours under a nitrogen atmosphere. During 30 min after completion of the dropwise addition, the mixture was kept at 110° C. Then, a mixed solution containing 20 g of xylene, 10 g of n-butanol, and 0.5 g of azobisisobutyronitrile was added dropwise over 1 hour, and the resulting mixture was maintained until 2 hours had passed after the dropwise addition. After that, the dropping funnel was replaced by a decanter, and 18.5 g of copper propionate, 25 g of naphthenic acid, and 50 g of deionized water were added. Subsequently, the resulting mixture was heated to 100° C., and propionic acid and water generated by the reaction were removed to yield the metal carboxylate-containing copolymer solution B-1. The viscosity of the resulting copolymer solution was 185 cps/25° C., the non-volatile content was 50.3%, and the Mw was 8,000.

Production Example 8 (Production of Copolymer Solution B-2)

First, 50 g of butyl acetate and 50 g of n-butanol were placed in a flask including a thermometer, a reflux condenser, a stirrer, and a dropping funnel. Next, the mixture was heated to 100 to 110° C., and a mixed solution containing 10.8 g of acrylic acid, 64.2 g of ethyl acrylate, 75 g of methyl methacrylate, and 3 g of azobisisobutyronitrile was then added dropwise over 4 hours under a nitrogen atmosphere. During 1 hour after completion of the dropwise addition, the mixture was kept at 110° C. Then, a mixed solution containing 30 g of butyl acetate and 0.5 g of azobisisobutyronitrile was added dropwise over 1 hour. After that, 12 g of zinc oxide, 20 g of butanol, and 1.5 g of deionized water were added, and the mixture was allowed to go under reaction at 120° C. for 10 hours to produce the metal carboxylate-containing copolymer solution B-2. The viscosity of the resulting copolymer solution was 430 cps/25° C., the non-volatile content was 50.9%, and the Mw was 7,000.

Production Example 9 (Production of Gum Rosin Zinc Salt Solution D-1)

Gum rosin (WW) made in China was dissolved in xylene to obtain a xylene solution with a solid content of 50%. Next, 400 g of the gum rosin-containing xylene solution (solid content: 50%) was added to a 1,000-ml flask equipped with a thermometer, a reflux condenser, and a stirrer, and 100 g of zinc oxide was further added thereto such that all of the resin acids in the gum rosin formed zinc salts. Thereafter, the mixture was dehydrated under reflux at 70 to 80° C. for 3 hours. After that, the mixture was cooled and filtrated to obtain the gum rosin zinc salt xylene solution D-1 containing a zinc salt of the resin acids (a transparent dark brown solution; the solid content: about 50%). The resulting xylene solution had a non-volatile content of 50.2%.

Examples 1 to 11 and Comparative Examples 1 to 13 (Production of Coating Compositions)

Components listed in Table 1 were blended in the proportions (% by mass) shown in Table 1, and were mixed and dispersed using glass beads with a diameter of 1.5 to 2.5 mm to produce the respective coating compositions. Each component in Table 1 is described in detail as follows.

Calcium sulfate dihydrate: a reagent, manufactured by Wako Pure Chemical Industries, Ltd.

Calcium sulfate hemihydrate: a reagent, Kishida Chemical Co., Ltd.

Cuprous oxide: product name "NC-301", with an average particle size of 3 μm, manufactured by Nissin Chemco, Ltd.

Copper pyrithione: product name "Copper Omadine", manufactured by Arch Chemicals, Inc.

Chlorinated paraffin: product name "TOYOPARAX 150", manufactured by Tosoh Corporation.

Calcium sulfate (anhydrate): a special grade chemical, manufactured by Kishida Chemical Co., Ltd.

Calcium carbonate: a reagent, manufactured by Wako Pure Chemical Industries, Ltd.

Barium sulfate: a reagent, manufactured by Wako Pure Chemical Industries, Ltd.

Silica: a special grade chemical, manufactured by Kishida Chemical Co., Ltd.

Bentonite: product name "Kunipia-F", manufactured by KUNIMINE INDUSTRIES CO., LTD.

Talc: product name "Crown Talc 3S", manufactured by MATSUMURA INDUSTRIES Co., Ltd.

Zinc oxide: product name "Zinc Oxide Type II", manufactured by Seido Chemical Industry Co., Ltd.

Red iron oxide: product name "TODA COLOR EP-13D", manufactured by Toda Pigment Corp.

Titanium oxide: product name "FR-41", manufactured by FURUKAWA CO., LTD.

Tetraethoxysilane: a special grade chemical, manufactured by Kishida Chemical Co., Ltd.

Fatty acid amide-based thixotropic agent: product name "Dispalon A603-20X" containing 20% xylene paste as a principal component, manufactured by Kusumoto Chemicals, Ltd.

TABLE 1

(Production of Coating Compositions)

| | Component name | | Example 1 | 2 | 3 | 4 | 5 | 6 | 7 | 8 | 9 | 10 | 11 | Comparative Example 1 |
|---|---|---|---|---|---|---|---|---|---|---|---|---|---|---|
| Co-polymer (A) | Tri-organosilyl ester-containing copolymer solution | A-1 | 25 | | | | | 25 | 25 | 25 | | 25 | 25 | 25 |
| | | A-2 | | 25 | | | | | | | 25 | | | |
| | | A-3 | | | 25 | | | | | | | | | |
| | | A-4 | | | | 25 | | | | | | | | |
| | | A-5 | | | | | 25 | | | | | | | |
| | | A-6 | | | | | | | | | | | | |
| | Metal carboxylate-containing copolymer solution | B-1 | | | | | | | | | | | | |
| | | B-2 | | | | | | | | | | | | |
| Calcium sulfate hydrate (B) | Calcium sulfate dihydrate | | 10 | 10 | 10 | 10 | 10 | 5 | 20 | | | | | |
| | Calcium sulfate hemihydrate | | | | | | | | | 10 | 10 | 5 | 20 | 1 |
| Anti-foulant (C) | Cuprous oxide | | 32 | 32 | 32 | 32 | 32 | 37 | 25 | 32 | 32 | 37 | 25 | 41 |
| | Copper pyrithione | | 3 | 3 | 3 | 3 | 3 | 3 | 3 | 3 | 3 | 3 | 3 | 3 |
| Release modifier (D) | Rosin metal salt solution D-1 | | 6 | 6 | 6 | 6 | 6 | 6 | 4 | 6 | 6 | 6 | 4 | 6 |
| Plasticizer (E) | Chlorinated paraffin | | 3 | 3 | 3 | 3 | 3 | 3 | 3 | 3 | 3 | 3 | 3 | 3 |
| Other additives | Calcium sulfate (anhydrate) | | | | | | | | | | | | | |
| | Calcium carbonate | | | | | | | | | | | | | |
| | Barium sulfate | | | | | | | | | | | | | |
| | Silica | | | | | | | | | | | | | |
| | Bentonite | | | | | | | | | | | | | |
| | Talc | | | | | | | | | | | | | |
| | Zinc oxide | | 5 | 5 | 5 | 5 | 5 | 5 | 5 | 5 | 5 | 5 | 5 | 5 |
| | Red iron oxide | | 3 | 3 | 3 | 3 | 3 | 3 | 2 | 3 | 3 | 3 | 2 | 3 |
| | Titanium oxide | | 1 | 1 | 1 | 1 | 1 | 1 | 1 | 1 | 1 | 1 | 1 | 1 |
| | Tetraethoxysilane | | 1 | 1 | 1 | 1 | 1 | 1 | 1 | 1 | 1 | 1 | 1 | 1 |
| | Fatty acid amide-base thixotropic agent | | 3 | 3 | 3 | 3 | 3 | 3 | 3 | 3 | 3 | 3 | 3 | 3 |
| Solvent | Xylene | | 9 | 9 | 9 | 9 | 9 | 9 | 9 | 9 | 9 | 9 | 9 | 9 |
| | Total | | 100 | 100 | 100 | 100 | 100 | 100 | 100 | 100 | 100 | 100 | 100 | 100 |
| | Total mass of solid content | | 73.5 | 73.6 | 73.7 | 73.5 | 73.8 | 73.5 | 74.5 | 73.5 | 73.5 | 73.5 | 74.5 | 73.6 |
| | Amount (% by mass) of calcium sulfate hydrate (B) | | 13.6% | 13.6% | 13.6% | 13.6% | 13.6% | 6.8% | 26.9% | 13.6% | 13.6% | 6.8% | 26.9% | 1.4% |
| | Mass ratio Copolymer (A)/Calcium sulfate hydrate (B) | | 1.2 | 1.2 | 1.2 | 1.2 | 1.3 | 2.5 | 0.6 | 1.2 | 1.2 | 2.5 | 0.6 | 12.4 |

| | Component name | | Comparative Example 2 | 3 | 4 | 5 | 6 | 7 | 8 | 9 | 10 | 11 | 12 | 13 |
|---|---|---|---|---|---|---|---|---|---|---|---|---|---|---|
| Co-polymer (A) | Tri-organosilyl ester-containing copolymer solution | A-1 | 25 | 25 | 25 | 25 | 25 | 25 | 25 | | | | | |
| | | A-2 | | | | | | | | | | | | |
| | | A-3 | | | | | | | | | | | | |
| | | A-4 | | | | | | | | | | | | |
| | | A-5 | | | | | | | | | | | | |
| | | A-6 | | | | | | | | | 25 | | | |
| | Metal carboxylate-containing copolymer solution | B-1 | | | | | | | | | | 25 | 25 | |
| | | B-2 | | | | | | | | | | | 25 | 25 |
| Calcium sulfate hydrate (B) | Calcium sulfate dihydrate | | | | | | | | | 10 | 10 | | 10 | |
| | Calcium sulfate hemihydrate | | | | | | | | | | | 10 | | 10 |
| Anti-foulant (C) | Cuprous oxide | | 32 | 25 | 32 | 32 | 32 | 32 | 32 | 32 | 32 | 32 | 32 | 32 |
| | Copper pyrithione | | 3 | 3 | 3 | 3 | 3 | 3 | 3 | 3 | 3 | 3 | 3 | 3 |
| Release modifier (D) | Rosin metal salt solution D-1 | | 6 | 4 | 6 | 6 | 6 | 6 | 6 | 6 | 6 | 6 | 6 | 6 |
| Plasticizer (E) | Chlorinated paraffin | | 3 | 3 | 3 | 3 | 3 | 3 | 3 | 3 | 3 | 3 | 3 | 3 |

TABLE 1-continued (Production of Coating Compositions)

| | | | | | | | | | | | | | |
|---|---|---|---|---|---|---|---|---|---|---|---|---|---|
| Other additives | Calcium sulfate (anhydrate) | 10 | 20 | | | | | | | | | | |
| | Calcium carbonate | | | 10 | | | | | | | | | |
| | Barium sulfate | | | | 10 | | | | | | | | |
| | Silica | | | | | 10 | | | | | | | |
| | Bentonite | | | | | | 10 | | | | | | |
| | Talc | | | | | | | 10 | | | | | |
| | Zinc oxide | 5 | 5 | 5 | 5 | 5 | 5 | 5 | 5 | 5 | 5 | 5 | 5 |
| | Red iron oxide | 3 | 2 | 3 | 3 | 3 | 3 | 3 | 3 | 3 | 3 | 3 | 3 |
| | Titanium oxide | 1 | 1 | 1 | 1 | 1 | 1 | 1 | 1 | 1 | 1 | 1 | 1 |
| | Tetraethoxysilane | 1 | 1 | 1 | 1 | 1 | 1 | 1 | 1 | 1 | 1 | 1 | 1 |
| | Fatty acid amide-base thixotropic agent | 3 | 3 | 3 | 3 | 3 | 3 | 3 | 3 | 3 | 3 | 2 | 3 |
| Solvent | Xylene | 9 | 9 | 9 | 9 | 9 | 9 | 9 | 9 | 9 | 9 | 9 | 9 |
| | Total | 100 | 100 | 100 | 100 | 100 | 100 | 100 | 100 | 100 | 100 | 100 | 100 |
| | Total mass of solid content | 73.6 | 74.5 | 73.5 | 73.6 | 73.6 | 73.6 | 73.6 | 61.2 | 73.8 | 73.8 | 73.9 | 73.9 |
| | Amount (% by mass) of calcium sulfate hydrate (B) | 0.0% | 0.0% | 0.0% | 0.0% | 0.0% | 0.0% | 0.0% | 16.3% | 13.6% | 13.6% | 13.5% | 13.5% |
| | Mass ratio Copolymer (A)/Calcium sulfate hydrate (B) | — | — | — | — | — | — | — | 0.0 | 1.3 | 1.3 | 1.3 | 1.3 |

Test Example 1 (Rotary Test)

A tank was provided, in the center thereof, with a rotating drum with a diameter of 515 mm and a height of 440 mm in order to allow the rotation of the drum by means of a motor. The tank was also provided with: a cooling apparatus for keeping the temperature of seawater constant; and an automatic pH controller for keeping the pH of the seawater constant.

Two test plates were prepared for each coating composition in accordance with the following method.

First, an anti-corrosive coating film was formed by applying an anti-corrosive coating material (a vinyl-based A/C) to a hard vinyl chloride plate (75×150×1 mm) such that the thickness after drying would be about 50 μm, followed by drying. Each of the antifouling coating compositions obtained in Examples 1 to 11 and Comparative Examples 1 to 13 was applied onto the anti-corrosive coating film such that the thickness after drying would be about 300 μm. The applied coating was dried for 3 days at 40° C., such that a test plate having the dry coating film with a thickness of about 300 μm was prepared.

One of the thus-prepared test plates was secured to the rotating drum of the rotary apparatus of the above-mentioned equipment and was made to contact the seawater, and the rotating drum was rotated at a speed of 20 knots. During the test, the seawater temperature was maintained at 25° C. and the pH at 8.0 to 8.2; the seawater was replaced once every week.

The initial thickness of the coating film and the remaining thickness of the coating film was measured every 3 months from the beginning of the test were determined using a laser focus displacement meter for each test plate, and the thickness of the dissolved coating film was calculated from the difference therebetween to give the dissolving amount of the coating film per month (μm/month). The measurement was conducted for 24 months, and the dissolving amount of the coating film was calculated every 12 months.

After the rotary test was completed (after 24 months), the test plate was dried, and the surface of each coating film was visually inspected to evaluate the state of the coating film.

The state was evaluated as follows.
A: No defects are observed.
B: Hairline cracks are slightly observed.
C: Hairline cracks are observed on the entire surface of the coating film.
D: Coating film defects such as large cracks, blisters or peel-offs are observed.

The results are shown in Table 2. It can be seen from Table 2 that the coating films formed using the coating compositions of the invention (Examples 1 to 11) were dissolved in seawater in amounts of about 2 to 6 μm per month (annual average). In addition, in the coating films formed using the coating compositions of the invention the dissolving rate is somewhat low, so that they are dissolved stably for an extended period of time. Furthermore, the coating films formed using the coating compositions of the invention are excellent in water resistance, and do not develop cracks or hairline cracks. In this way, the antifouling effect can be maintained for a long time.

In contrast, the coating films formed using the coating compositions of Comparative Examples 4 and 5 have low water resistance, and thus develop coating film defects such as cracks or peel-offs during the test. Furthermore, the coating films formed using the coating compositions of Comparative Examples 1 to 3 and 6 to 13 are superior in water resistance, but develop cracks after the long-term use. Moreover, the coating films formed using the coating compositions of Comparative Examples 9 and 13 have an increased initial dissolving rate of the coating film in seawater, but have a reduced dissolving rate after 12 months. That is, the above coating films cannot exhibit the antifouling effect for a long period.

Test Example 2 (Antifouling Test)

Each of the coating compositions obtained in Examples 1 to 11 and Comparative Examples 1 to 13 was applied to both surfaces of a hard vinyl chloride plate (100×200×2 mm) such that the thickness of the dry coating film would be about 200 μm. The applied coating was dried for 3 days at room temperature (25° C.), such that a test plate having a dry coating film with a thickness of about 200 μm was prepared. These test plates were immersed at 1.5 m below sea level in Owase City, Mie Prefecture, Japan, and fouling of each test plate was examined for 12 months.

The evaluation was conducted by visual inspection for the state of the surface of the coating film in accordance with criteria shown below.

A: Fouling organisms such as shellfish or algae are not attached, and slime is hardly attached.
B: Fouling organisms such as shellfish or algae are not attached, and slime is thinly attached (to the extent that the coating film surface is observable) and the slime can be removed when wiped softly with a brush.
C: Fouling organisms such as shellfish or algae are not attached, but slime is thickly attached (to the extent that the coating film surface is not observable) and the slime cannot be removed even when wiped strongly with a brush.
D: Fouling organisms such as shellfish or algae are attached The results are shown in Table 2. It can be seen from Table 2 that fouling organisms such as shellfish or algae are not attached and slime is hardly attached to the coating films formed using the coating compositions of the invention (Examples 1 to 11).

In contrast, fouling organisms such as shellfish, algae, and/or slime are attached, after 12-month immersion, to the coating films formed using the coating compositions of Comparative Examples 1 to 13.

[formula 1]

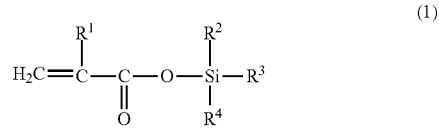

wherein $R^1$ is a hydrogen atom or a methyl group; and $R^2$, $R^3$, and $R^4$ are the same or different from each other and each represents a $C_{3-6}$ alkyl group branched at an α-position or a phenyl group; and (b) an ethylenically unsaturated monomer copolymerizable with the triorganosilyl (meth)acrylate monomer;

wherein a content of the calcium sulfate hydrate when converted to a solid content is from 5 to 50% by mass with respect to a solid content of the antifouling coating composition, and

TABLE 2

(Evaluation Results)

| | | Example | | | | | | | | | | | Comparative Example | | | | | | | | | | | | |
|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 | 4 | 5 | 6 | 7 | 8 | 9 | 10 | 11 | 12 | 13 |
| Rotary test | Average dissolving amount of a coating film during the first 12 months (μm/month) | 4.2 | 4.8 | 5.9 | 3.5 | 3.8 | 3.7 | 3.2 | 2.7 | 3.0 | 2.5 | 2.3 | 1.5 | 1.7 | 1.5 | 13.8 | 10.9 | 2.8 | 2.1 | 2.5 | 7.0 | 7.0 | 6.5 | 6.8 | 6.5 |
| | Average dissolving amount of a coating film between 12 and 24 months (μm/month) | 4.3 | 5.0 | 6.5 | 3.6 | 3.5 | 4.0 | 3.1 | 3.0 | 3.1 | 2.4 | 2.5 | 1.8 | 1.8 | 1.7 | 12.0 | 12.6 | 1.9 | 1.9 | 2.3 | 1.2 | 1.0 | 0.8 | 0.9 | 0.5 |
| | Coating film conditions after 24 months | A | A | B | A | A | B | A | B | B | B | B | D | D | D | D | D | D | D | D | D | D | D | D | D |
| Anti-fouling test | After 6 months | A | A | A | A | A | A | A | A | A | A | A | A | A | A | A | A | A | A | A | A | A | A | A | A |
| | After 9 months | A | A | A | A | A | A | A | A | B | B | B | B | B | B | B | B | C | C | C | B | B | C | C | C |
| | After 12 months | A | A | A | A | A | B | A | B | B | B | B | C | C | C | D | D | D | C | C | D | C | D | C | D |

The embodiments of the invention in which an exclusive property or privilege is claimed are defined as follows:

1. A method of producing an antifouling coating composition comprising the steps of:

mixing a triorganosilyl ester-containing copolymer and calcium sulfate hydrate; wherein the triorganosilyl ester-containing copolymer is obtained from a mixture of:

(a) a triorganosilyl (meth)acrylate monomer represented by general formula (1):

wherein a content proportion of the triorganosilyl ester-containing copolymer to the calcium sulfate hydrate is from 0.4 to 3 by mass ratio when converted to a solid content.

2. The method according to claim 1, wherein the calcium sulfate hydrate is a calcium sulfate dihydrate.

3. An object comprising a surface, wherein the surface comprises an antifouling coating film comprising the antifouling coating composition according to claim 1.

* * * * *